Patented Apr. 29, 1924.

1,492,507

UNITED STATES PATENT OFFICE.

MARY JANE BRADSHAW, OF SASKATOON, SASKATCHEWAN, CANADA.

CLEANSING COMPOSITION.

No Drawing.     Application filed April 17, 1922.   Serial No. 553,995.

*To all whom it may concern:*

Be it known that I, MARY J. BRADSHAW, a subject of the King of Great Britain, residing at Saskatoon, in the Province of Saskatchewan and Dominion of Canada, have invented new and useful Improvements in Cleansing Composition, of which the following is a specification.

The object of this invention is the production of a composition to be used for cleansing and sterilizing purposes, the composition being particularly designed for use upon dental and medical instruments and cabinets.

The composition will not only clean and sterilize the instruments and other objects but will prevent rust and will give a high polish to the objects.

The composition consists of the following ingredients combined in the proportions stated, viz:—

24 pounds powered soap,
72 pounds sodium carbonate,
1 pound caustic soda,
2 pounds borax,
1 pound of powdered chalk.

Above is sufficient to make 100 pounds of the composition.

The above composition should be mixed with boiling water in the proportion of two table spoonfuls of the composition to a quart of water and placed in a basin. The medical and dental instruments, or parts thereof, such as dental burrs, pluggers, stones, slabs, brushes, et cetera should then be placed in the basin with the solution and brushed with a small nail brush.

On remaining in the solution two minutes they are thoroughly sterilized.

On removal from the solution the instruments and burrs should be thoroughly dried with a clean cloth.

For cleansing cabinets half a tea spoonful of the composition should be placed in a quart of water and the cabinets washed with a wet cloth immersed in the solution.

What I claim is:—

A cleansing composition for dental and medical instruments consisting of 24 pounds powdered soap, 72 pounds sodium carbonate, 1 pound caustic soda, 2 pounds borax and 1 pound of powdered chalk used with boiling water in the proportion of two tablespoonsful of the composition to a quart of water.

In testimony whereof I affix my signature.

MARY JANE BRADSHAW.

Witness:
JOHN CAIRNS.